Figure 1:
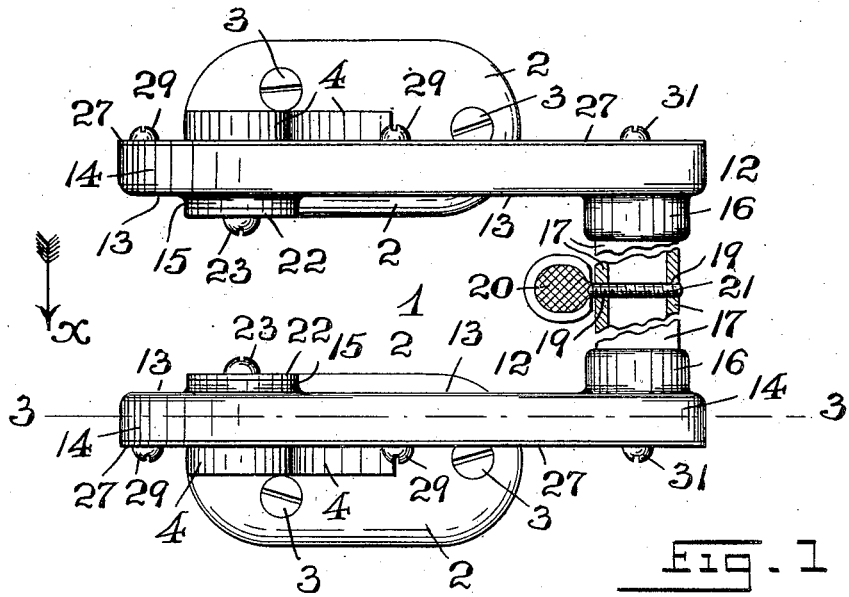

No. 880,730. PATENTED MAR. 3, 1908.
L. W. GROUT.
FOOT REST OR GUARD FOR VEHICLES.
APPLICATION FILED MAY 23, 1907.

2 SHEETS—SHEET 1.

WITNESSES:
F.H.W. Fraentzel
Anna H. Alter

INVENTOR:
Lewis W. Grout,
BY
Fraentzel and Richards,
ATTORNEYS

No. 880,730. PATENTED MAR. 3, 1908.
L. W. GROUT.
FOOT REST OR GUARD FOR VEHICLES.
APPLICATION FILED MAY 23, 1907.
2 SHEETS—SHEET 2.
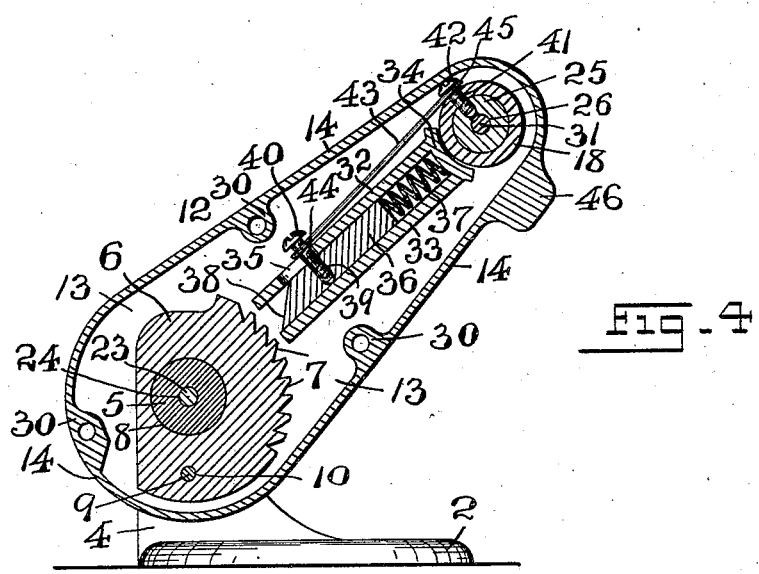
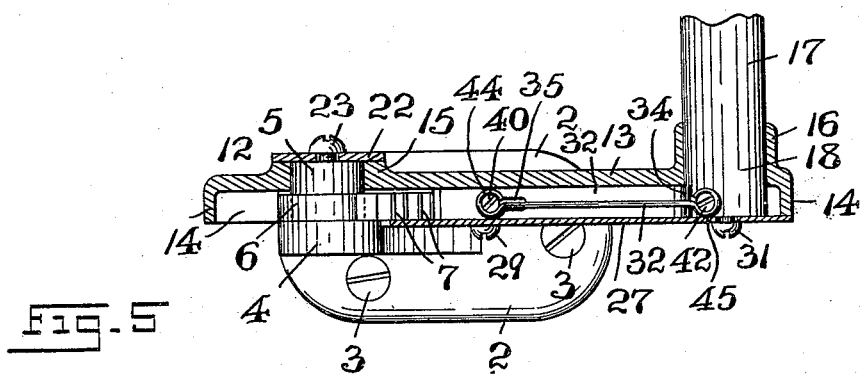
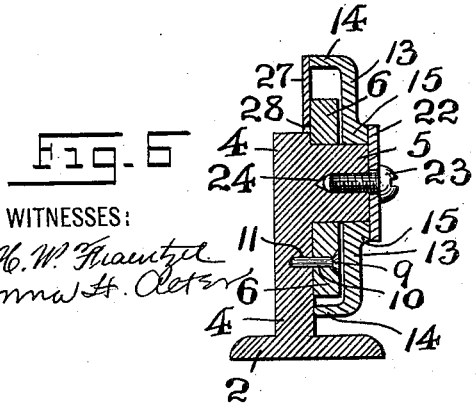
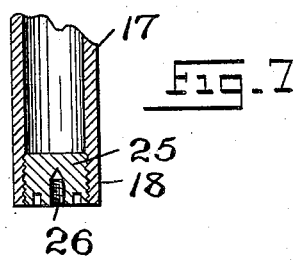
WITNESSES:
INVENTOR:
Lewis W. Grout,
BY
Fraentzel and Richards,
ATTORNEYS

UNITED STATES PATENT OFFICE.

LEWIS W. GROUT, OF SPRINGFIELD, MASSACHUSETTS, ASSIGNOR OF ONE-HALF TO WILLIAM NICOLL, OF NEWARK, NEW JERSEY.

FOOT REST OR GUARD FOR VEHICLES.

No. 880,730.  Specification of Letters Patent.  Patented March 3, 1908.

Application filed May 23, 1907. Serial No. 375,250.

*To all whom it may concern:*

Be it known that I, LEWIS W. GROUT, a citizen of the United States, residing at Springfield, in the county of Hampden and State of Massachusetts, have invented certain new and useful Improvements in Foot Rests or Guards for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in foot rails, guards or supports; and this invention has reference, more particularly, to a novel foot-rail, guard or support which is adapted to be arranged in the body of an automobile, or other vehicle, the rail, guard or support being located in front of the rear seat of the vehicle, and being preferably of such a construction that it can be easily raised or lowered so as to be capable for proper adjustment and to provide great comfort to the person or persons seated upon the rear seat of the vehicle.

My present inventon, therefore, has for its principal object to provide a foot-rest, rail, guard or support in connection with the body and rear seat of a vehicle, and especially an automobile, which shall be of a very simple and effective construction, and shall provide great comfort to the person or persons seated upon the rear seat of the vehicle, upon which, as will be clearly evident, in fast riding it is with difficulty that one can be comfortably seated without being braced.

Other objects of this invention not at this time more particularly enumerated, will be clearly understood from the following detailed description of the invention.

With the various objects of my present invention in view, the invention consists in the novel foot-rest, rail, guard, or support hereinafter set forth; and, furthermore, this invention consists in the various arrangements and combinations of devices and parts, all of which will be hereinafter more fully described and then finally embodied in the clauses of the claims which are appended to and which form an essential part of this specification.

The invention is clearly illustrated in the accompanying drawings, in which:—

Figure 2:
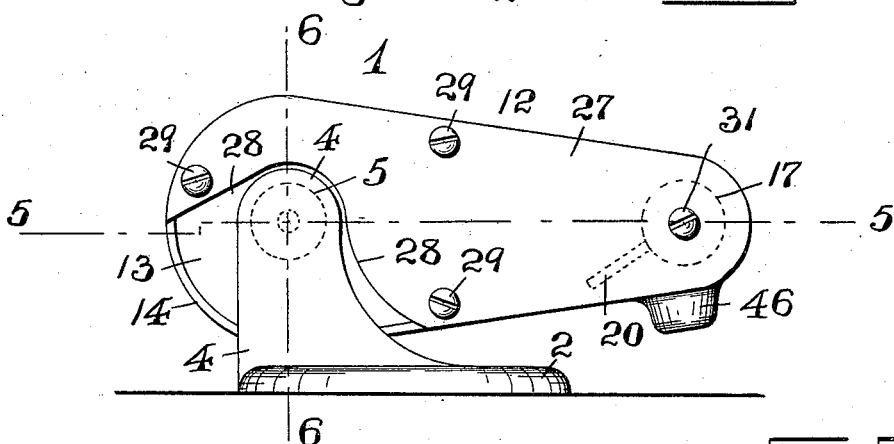
Figure 3:
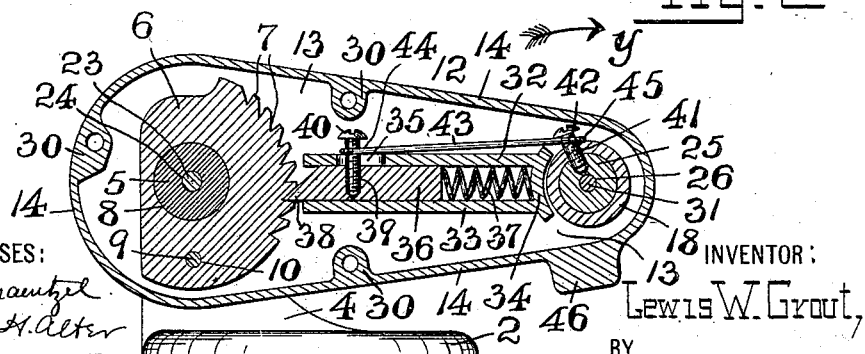

Figure 1 is a plan or top view of my novel form of adjustable foot-rest, guard, rail or support, the rail, bar or rod for the support of the feet thereon, being represented in horizontal section, and in part only. Fig. 2 is a side elevation of the device; and Fig. 3 is a longitudinal vertical section, taken on line 3—3 in said Fig. 1, looking in the direction of the arrow x. Fig. 4 is a similar sectional representation of the same parts, showing the manner of withdrawing a holding dog from its positive engagement with the toothed or serrated portion of a retaining disk or plate, and representing the parts in one of their raised positions. Fig. 5 is a horizontal sectional representation taken on line 5—5 in said Fig. 2, certain elements or parts of the device being shown in top or plan view. Fig. 6 is a transverse section, taken on line 6—6 in said Fig. 2; and Fig. 7 is a detail sectional representation of the one end-portion of the foot-rail, bar or rod.

Similar characters of reference are employed in all of the above described views, to indicate corresponding parts.

Referring now to the several figures of the drawings, the reference-character 1 indicates a pair of suitably constructed brackets or supports, of which there are two of them, each support or bracket comprising a perforated base-plate 2, for the reception of screws 3, or other suitable fastening means, for securing said base-plates in the desired positions rigidly to the floor of the body of the vehicle. Each base-plate is provided with an upwardly extending pedestal, support or post 4, each post having at its upper portion a laterally extending cylindrical boss or journal 5, as will be clearly evident from an inspection of the several figures of the drawings.

Suitably disposed upon each boss, hub or journal 5 is a disk or plate 6, which may be of any suitable marginal configuration, and is provided upon a portion of its marginal surface-portion with suitably shaped teeth or serrations 7. While each disk or plate 6 may form an integral part of each support or post 4, still I prefer to make them separable from each post, each disk or plate in that case being provided with a centrally disposed hole or open portion 8, for arranging the disk or plate upon the corresponding boss, hub or journal 5, a second hole 9 being provided for the reception of a suitable pin 10, or the like, which is inserted through said hole 9 and is driven into a receiving portion or socket 11 in the post. In this manner, each disk or plate is held against turning upon the side of each support or post, as will be clearly evident and for the purposes to be presently more fully described.

Arranged in an oscillatory manner upon each boss, hub or journal 5 is a shell or casing 12, each casing being made of any suitable shape, but preferably of the usual configuration of a crank-arm, substantially as illustrated, and each casing comprising a face-plate 13 which is provided with a laterally extending marginal flange 14, substantially as shown. Each face-plate is made with a tubular hub or element 15 in which is fitted or registers a boss or journal 5, so that each shell or casing is capable of a reciprocating-oscillatory motion at the side of the respective post or standard 4 which is secured in its fixed position within and upon the floor of the body of the vehicle. At the opposite end-portion, the face-plate of each shell or casing 12 is provided with another tubular hub 16 for the reception of an end-portion 18 of a suitable foot-supporting rail, bar or rod 17. In practice, the rail is usually a piece of tubular pipe, the same being provided at its middle or any other suitable portion, with the screw-threaded or other holes 19 for the arrangement and securing therein of the shank or stem 21 of a suitably constructed lift or actuating device 20.

Having thus arranged a shell or casing 12 upon the boss or journal 5 of each post or standard 4, the said shell can be secured in its oscillatory relation, against lateral displacement, by means of a disk or washer 22 and a tightening screw 23, the shank of which is screwed into a screw-threaded socket 24 in the boss or journal 5, as clearly illustrated in Fig. 6 of the drawings. The rail, rod or bar 17 has its end-portions loosely and rotatively arranged in the respective tubular hubs 16, each rail or rod having in its tubular end-portion a suitable plug, as 25, which is provided with a screw-threaded receiving socket 26. A plate or cover-section 27, which is formed with the open part 28, so as not to interfere with the oscillations of each shell or casing 12, is secured upon the flange 14 of each face-plate 13, by means of screws 29, which are screwed into suitably disposed screw-threaded receiving sockets 30, substantially as shown. The said plate or cover-section 27, at the point where it is arranged directly over the end of the rail, bar or rod 17, and the plug 25 therein, is made with a hole or perforation for the reception of a screw 31, the diameter of which is slightly less than the diameter of said hole, so that when the screws 31 are inserted in their respective holes and screwed into the respective receiving sockets 26 at the ends of the said rail, rod or bar 17, the latter is capable of a rotary motion in its supporting bearings, formed by the hubs 16, irrespective of the general oscillatory motion of the main shell or casing, substantially as and for the purposes to be presently more fully described.

Referring now more particularly to Figs. 3, 4 and 5 of the drawings, it will be seen that the face-plate 13 of each shell or casing 12 is provided upon its inner face with a pair of inwardly extending ribs or flanges 32 and 33, which are connected by a part 34, and one of which is formed with an opening or slot 35. The said flanges or ribs 32 and 33 preferably form integral portions of said face-plate, but they may be otherwise connected therewith, as will be clearly evident. Slidably arranged within the guide thus formed by the said flanges or ribs and the inner face-portions of the face-plate 13 and the plate or cover-section 27 is a bolt or dog 36, having a spring 37 back of it, substantially as shown, for forcing the holding portion or nosing 38 of said bolt or dog normally in retaining engagement with any portion of the toothed or serrated part of the disk or plate 6, as clearly illustrated in Fig. 3 of the drawings. The movement of the said bolt or dog within the guide is regulated and limited by a screw or pin 39 which extends through the opening or slot 35 and is secured to said bolt, as shown. The said screw or pin 39 extends above the upper surface of the flange or rib 32, and is provided with an enlargement or head 40. A screw or pin 41 is also secured in each end-portion of the said rail, rod or bar 17, as shown in said Fig. 3, said screw or pin 41 being provided with an enlargement or head 42. The reference-character 43 indicates a link or other suitable connection, which is formed at its ends with the eyes 44 and 45 by means of which the link is operatively connected with the respective screws or pins 39 and 41, the enlargements or heads 40 and 42 preventing the accidental displacement of said eyes 44 and 45 from their operative connection with the respective screws or pins.

The various parts having been arranged in their assembled relations, and having been secured in their operative positions upon the floor of the body of the vehicle, in the proper position in front of the rear seat, the foot-rail, rod or bar 17 may be retained in the position indicated in Figs. 2 and 3 of the drawings, being one position for placing the feet upon said rail, rod or bar, as a brace. When the said rail, rod or bar is to be brought into any one of its raised positions, one of which is indicated in Fig. 4, all that a person seated upon the rear seat has to do is to place his or her foot beneath the lift or actuating device 20. Then by pressing slightly in an upward direction, a slight rotary motion of the rail, rod or bar 17 is produced in the direction of the arrow y indicated in said Fig. 3. This action causes the links or connections 43 to pull upon the pins or screws 39, whereby the nosings of the bolts or dogs 36 are withdrawn from their holding engagement with the toothed or serrated parts of the respective disks or plates 6, and by continuing the lifting pressure upon said lift or device 20, the parts can be rotated into another position, as for instance that shown in Fig. 4 of the drawings. Upon removing the foot from beneath the lift or device 20, immediately the previously compressed spring 37 will exert itself, thereby at once again forcing the nosings 38 of the bolts or dogs 36 into another holding or retaining position with the toothed or serrated parts of the disks or plates 6, as will be clearly evident. In this manner, the rail, rod or bar 17 can be raised or lowered at will, and readily brought into any one of its adjusted positions to suit the desires of the person or persons seated upon the rear seat of the vehicle.
If desired, each shell or casing 12 may be provided upon the outer face of its lower flange with a projection, as 46, which forms a suitable foor-piece, adapted to rest upon the floor of the body of the vehicle, when the rail, rod or bar, and the two shells or casing 12 have been brought into their lowest positions.

From the foregoing description of my present invention, it will be clearly evident, that I have provided a simply constructed device or mechanism, in the form of an adjustable foot-rest or support, which is admirably adapted for use with the rear seats of automobiles, to enable the person or persons upon the rear seat to properly brace themselves against the customary jouncing in vehicles of this character, and thereby providing great comfort and pleasure, especially during fast riding.

I claim:

1. A combined foot-rest and brace for vehicles comprising, a pedestal, a casing pivotally connected with said pedestal, and means connected with said casing for connecting the end-portion of a foot-rail to said casing, and means within said casing for rigidly securing said foot-rail in any one of its adjusted positions, consisting of a fixed toothed or serrated disk, a bolt slidably arranged in said casing, said bolt being normally in holding engagement with said toothed or serrated disk, and means for withdrawing said bolt from its holding engagement with said disk, substantially as and for the purposes set forth.

2. A combined foot-rest and brace for vehicles comprising a pair of pedestals, a casing pivotally connected with each pedestal, a foot-rail connected at each end-portion with a casing, and means upon said foot-rail for producing an oscillatory motion of said casings, and means within each casing for rigidly securing said foot-rail in any one of its adjusted positions, consisting of a fixed toothed or serrated disk, a bolt slidably arranged in said casing, said bolt being normally in holding engagement with said toothed or serrated disk, and means for withdrawing said bolt from its holding engagement with said disk, substantially as and for the purposes set forth.

3. A combined foot-rest and brace for vehicles comprising a pair of pedestals, a casing pivotally connected with each pedestal, a tubular hub upon each casing, and a foot-rail rotatively mounted in the hubs of said casings, substantially as and for the purposes set forth.

4. A combined foot rest and brace for vehicles comprising a pair of pedestals, a casing pivotally connected with each pedestal, a tubular hub upon each casing, and a foot-rail rotatively mounted in the hubs of said casings, and means for producing such rotative movement of the foot-rail, consisting of a shank extending from the foot-rail, and a lift connected with said shank, substantially as and for the purposes set forth.

5. A combined foot-rest and brace for vehicles comprising a pair of pedestals, a casing pivotally connected with each pedestal, a tubular hub upon each casing, and a foot-rail rotatively mounted in the hubs of said casings, and means within each casing for rigidly securing the foot-rail in any one of its adjusted positions, substantially as and for the purposes set forth.

6. A combined foot-rest and brace for vehicles comprising a pair of pedestals, a casing pivotally connected with each pedestal, a tubular hub upon each casing, and a foot-rail rotatively mounted in the hubs of said casings, and means for producing such rotative movement of the foot-rail, consisting of a shank extending from the foot-rail, and a lift connected with said shank, and means within each casing for rigidly securing the foot-rail in any one of its adjusted positions, substantially as and for the purposes set forth.

7. A combined foot-rest and brace for vehicles comprising a pair of pedestals, a casing pivotally connected with each pedestal, a tubular hub upon each casing, and a foot-rail rotatively mounted in the hubs of said casings, means within each casing for rigidly securing the foot-rail in any one of its adjusted positions, consisting of a fixed toothed or serrated disk in each casing, a bolt slidably arranged in each casing, each bolt being normally in holding engagement with a toothed or serrated disk, and means for withdrawing said bolts from their holding engagements with said disks, substantially as and for the purposes set forth.

8. A combined foot-rest and brace for vehicles comprising a pair of pedestals, a casing pivotally connected with each pedestal, a tubular hub upon each casing, and a foot-rail rotatively mounted in the hubs of said casings, and means for producing such rotative movement of the foot-rail, consisting of a shank extending from the foot-rail, and a lift connected with said shank, means within each casing for rigidly securing the foot-rail in any one of its adjusted positions, consisting of a fixed toothed or serrated disk in each casing, each bolt being normally in holding engagement with a toothed or serrated disk, and a means of connection between each bolt and the foot-rail for withdrawing said bolts from their holding engagements with said disks, substantially as and for the purposes set forth.

9. A combined foot-rest and brace for vehicles comprising a pair of pedestals, a casing pivotally connected with each pedestal, a tubular hub upon each casing, and a foot-rail rotatively mounted in the hubs of said casings, and means for producing such rotative movement of the foot-rail, consisting of a shank extending from the foot-rail, and a lift connected with said shank, means within each casing for rigidly securing the foot-rail in any one of its adjusted positions, consisting of a fixed toothed or serrated disk in each casing, each bolt being normally in holding engagement with a toothed or serrated disk, and a means of connection between each bolt and the foot-rail for withdrawing said bolts from their holding engagements with said disks, consisting of a pin extending from each bolt, a pin at each end-portion of the foot-rail, and a link-connection between said pins, substantially as and for the purposes set forth.

10. The herein described combined foot-rest and brace comprising a pair of pedestals, a laterally extending boss upon each pedestal, a casing pivotally mounted upon each boss, each casing comprising a face-plate, a marginal flange, and a cover-section secured to said flange, a tubular hub extending from each face-plate, a foot-rail rotatively mounted in said hubs, a fixed toothed or serrated disk secured to each pedestal, a guide within each casing, each guide comprising a pair of ribs, one of said ribs having an opening, and a bolt slidably arranged in each guide, a spring back of each bolt for forcing the bolt normally in holding engagement with a toothed or serrated disk, a pin extending from each bolt, each pin being movably arranged in the opening of one of said ribs, a pin at each end-portion of said foot-rail, a link-connection between said pins, and means connected with said foot-rail for producing a rotative movement of the same for withdrawing the bolts from their holding engagements with said toothed or serrated disks, substantially as and for the purposes set forth.

11. The herein described combined foot-rest and brace comprising a pair of pedestals, a laterally extending boss upon each pedestal, a casing pivotally mounted upon each boss, each casing comprising a face-plate, a marginal flange, and a cover-section secured to said flange, a tubular hub extending from each face-plate, a foot-rail rotatively mounted in said hubs, a fixed toothed or serrated disk secured to each pedestal, a guide within each casing, each guide comprising a pair of ribs, one of said ribs having an opening, and a bolt slidably arranged in each guide, a spring back of each bolt for forcing the bolt normally in holding engagement with a toothed or serrated disk, a pin extending from each bolt, each pin being movably arranged in the opening of one of said ribs, a pin at each end-portion of said foot-rail, a link-connection between said pins, and means connected with said foot-rail for producing a rotative movement of the same for withdrawing the bolts from their holding engagements with said toothed or serrated disks, consisting of a shank extending from the foot-rail, and a lift connected with said shank, substantially as and for the purposes set forth.

In testimony that I claim the invention set forth above I have hereunto set my hand this 22nd day of May, 1907.

LEWIS W. GROUT.

Witnesses:
FREDK. C. FRAENTZEL,
F. H. W. FRAENTZEL.